United States Patent
Chacko et al.

(10) Patent No.: US 8,032,568 B2
(45) Date of Patent: Oct. 4, 2011

(54) METHOD FOR PERFORMING MEMORY LEAK ANALYSIS INSIDE A VIRTUAL MACHINE

(75) Inventors: Joseph K. Chacko, Sheffield (GB); Stephen Flavell, Southampton (GB); Hedley Proctor, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 12/164,250

(22) Filed: Jun. 30, 2008

(65) Prior Publication Data
US 2009/0327373 A1 Dec. 31, 2009

(51) Int. Cl.
*G06F 17/30* (2006.01)

(52) U.S. Cl. .......................................... 707/814

(58) Field of Classification Search ................... 707/814
See application file for complete search history.

(56) References Cited

U.S. PATENT DOCUMENTS

| | | | |
|---|---|---|---|
| 5,752,241 A * | 5/1998 | Cohen ........................... | 707/713 |
| 6,167,535 A * | 12/2000 | Foote et al. ........................ | 714/38 |
| 6,321,240 B1 * | 11/2001 | Chilimbi et al. ...................... | 1/1 |
| 6,330,556 B1 * | 12/2001 | Chilimbi et al. ...................... | 1/1 |
| 6,381,735 B1 * | 4/2002 | Hunt ............................ | 717/158 |
| 6,560,773 B1 * | 5/2003 | Alexander et al. ............. | 717/128 |
| 6,658,652 B1 * | 12/2003 | Alexander et al. ............. | 717/128 |
| 6,675,379 B1 * | 1/2004 | Kolodner et al. ............. | 717/155 |
| 6,934,615 B2 * | 8/2005 | Flann et al. ..................... | 701/50 |
| 6,986,117 B1 * | 1/2006 | Teig et al. ..................... | 716/129 |
| 7,069,281 B2 * | 6/2006 | Garthwaite ......................... | 1/1 |
| 7,092,978 B2 * | 8/2006 | Garthwaite ......................... | 1/1 |
| 7,100,003 B2 * | 8/2006 | Betancourt et al. ............ | 711/159 |
| 7,234,080 B2 * | 6/2007 | Cirne et al. ....................... | 714/38 |
| 7,293,051 B1 * | 11/2007 | Printezis et al. ............... | 707/814 |
| 7,313,661 B1 * | 12/2007 | Dmitriev ........................ | 711/159 |
| 7,325,106 B1 * | 1/2008 | Dmitriev et al. .............. | 711/159 |
| 7,389,395 B1 * | 6/2008 | Garthwaite et al. ........... | 711/165 |
| 7,412,466 B1 * | 8/2008 | Garthwaite ........................... | 1/1 |
| 7,434,206 B2 * | 10/2008 | Seidman et al. ............... | 717/124 |
| 7,480,782 B2 * | 1/2009 | Garthwaite ..................... | 711/170 |
| 7,526,750 B2 * | 4/2009 | Andrews et al. .............. | 717/104 |

(Continued)

OTHER PUBLICATIONS

Rong Zhou and Eric A. Hansen. 2002. Memory-Bounded A Graph Search. In Proceedings of the Fifteenth International Florida Artificial Intelligence Research Society Conference, Susan M. Haller and Gene Simmons (Eds.). AAAI Press 203-209.*

(Continued)

*Primary Examiner* — Neveen Abel Jalil
*Assistant Examiner* — Mark Andrew X Radtke
(74) *Attorney, Agent, or Firm* — Scully, Scott, Murphy & Presser, P.C.; Randall J. Bluestone, Esq.

(57) ABSTRACT

A method, system, computer program product, and computer program storage device for performing a memory leak analysis inside a virtual machine is disclosed. By utilizing thread stack(s), class statics, and/or a list of root objects, a DFS algorithm starts execution at root objects in the thread stack (s), class statics, and/or a list of root objects. Upon fully processing an object, a reachability (sum of sizes of all child objects plus a size of the object itself) of the object is calculated. When the reachability of the object is larger than a threshold and when all reachabilities of children of the objects are less than another threshold (i.e., a largest child reachability of the object is less than another threshold), the object is determined as a potential source of a memory leak.

20 Claims, 4 Drawing Sheets

U.S. PATENT DOCUMENTS

| | | | |
|---|---|---|---|
| 7,584,232 B2 * | 9/2009 | Guo | 1/1 |
| 7,594,111 B2 * | 9/2009 | Kiriansky et al. | 713/166 |
| 7,603,704 B2 * | 10/2009 | Bruening et al. | 726/22 |
| 7,802,232 B2 * | 9/2010 | Zorn et al. | 717/124 |
| 7,827,538 B2 * | 11/2010 | Trotter | 717/127 |
| 7,870,170 B2 * | 1/2011 | Achanta et al. | 707/816 |
| 2002/0072830 A1 * | 6/2002 | Hunt | 701/1 |
| 2004/0078540 A1 * | 4/2004 | Cirne et al. | 711/170 |
| 2004/0154016 A1 * | 8/2004 | Randall | 718/1 |
| 2004/0167945 A1 * | 8/2004 | Garthwaite | 707/206 |
| 2004/0167947 A1 | 8/2004 | Garthwaite | |
| 2004/0181562 A1 * | 9/2004 | Findeisen | 707/206 |
| 2004/0181782 A1 * | 9/2004 | Findeisen | 717/130 |
| 2004/0193349 A1 * | 9/2004 | Flann et al. | 701/50 |
| 2005/0114844 A1 * | 5/2005 | Betancourt et al. | 717/128 |
| 2006/0206885 A1 * | 9/2006 | Seidman et al. | 717/148 |
| 2006/0247907 A1 * | 11/2006 | Qadeer et al. | 703/22 |
| 2006/0253845 A1 * | 11/2006 | Achanta et al. | 717/151 |
| 2007/0027942 A1 | 2/2007 | Trotter | |
| 2008/0082968 A1 * | 4/2008 | Chang et al. | 717/128 |
| 2008/0172708 A1 * | 7/2008 | Perry et al. | 725/110 |
| 2008/0271104 A1 * | 10/2008 | Perry et al. | 725/118 |
| 2008/0271105 A1 * | 10/2008 | Perry et al. | 725/118 |
| 2008/0276293 A1 * | 11/2008 | Perry et al. | 725/118 |
| 2009/0089842 A1 * | 4/2009 | Perry et al. | 725/78 |

OTHER PUBLICATIONS

Koushik Sen, Darko Marinov, and Gul Agha. 2005. CUTE: a concolic unit testing engine for C. In Proceedings of the 10th European software engineering conference held jointly with 13th ACM SIGSOFT international symposium on Foundations of software engineering (ESEC/FSE-13). ACM, New York, NY, USA, 263-272. DOI=10.1145/1081706.1081750.*

Thomas Reps, Susan Horwitz, and Mooly Sagiv. 1995. Precise interprocedural dataflow analysis via graph reachability. In Proceedings of the 22nd ACM SIGPLAN-SIGACT symposium on Principles of programming languages (POPL '95). ACM, New York, NY, USA, 49-61. DOI=10.1145/199448.199462.*

Tsai, Timothy et al., "Low-Overhead Run-Time Memory Leak Detection and Recovery", 12th Pacific Rim International Symposium on Dependable Computing, (PRDC'06), 2006, pp. 329-340, IEEE.

* cited by examiner

METHOD FOR PERFORMING MEMORY LEAK ANALYSIS INSIDE A VIRTUAL MACHINE

BACKGROUND OF THE INVENTION

1. Field of the Invention

The present invention generally relates to performing a memory leak analysis in a computing system. More particularly, the present invention relates to a method, system, computer program product, and computer program storage device for performing a memory leak analysis inside a virtual machine by utilizing a depth first search (DFS) algorithm.

2. Description of the Prior Art

A lot of computer programs suffer from memory leaks, where an amount of memory used by the programs increases over time due to a bug. In C language, a memory leak is created by losing a pointer to a section of memory. Java and other managed runtime environments (e.g., .NET) do not suffer from this class of memory leak (e.g., a memory leak caused by losing a pointer), as Java and other managed runtime environments use automatic garbage collection. However, in Java and .NET, it is still possible for a programmer to write a program that creates objects, uses them, then does not correctly make them available for garbage collection. For example, a memory leak pattern in Java or .NET is usually caused from a collection class with a large number of objects. In the memory leak pattern in Java or .NET, a programmer makes a mistake that does not remove objects from the collection class when the objects are no longer needed. This mistake usually results in a very large collection class. There are currently two main ways to analyze this memory leak.

A first way is simply counting the number of objects of each class. The first way does not require a complex algorithm, so is a fast technique. The first way may be able to identify objects which are not being cleaned up, but does not give a user any information about a thread, a method and an object that are causing a memory leak. Since the first way is fast, it can be performed at runtime, inside a runtime environment (e.g. the Java Virtual Machine). In addition, the first way can be performed outside a runtime environment such as a dump of a heap (i.e., transferring contents of a heap in a main memory to a file). Examples: BEA® JRocket® Memory Leak Detector (http://e-docs.bea.com/jrockit/tools/usingmmleak/index.html)

Figure 1:
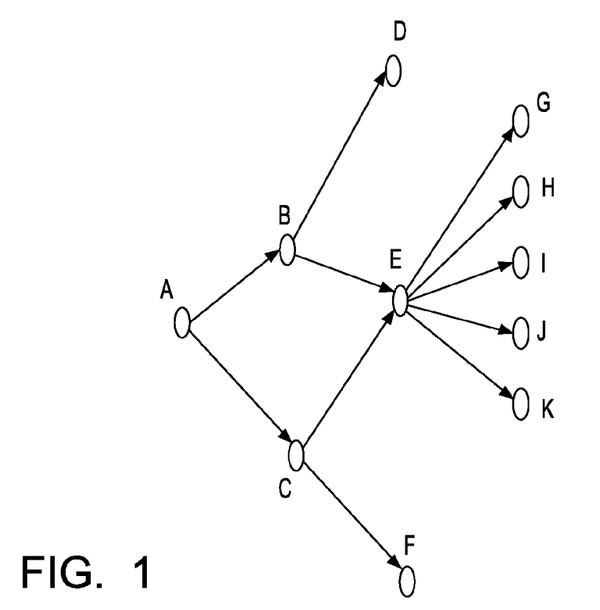
FIG. 1 illustrates an exemplary heap.

A depth first search (DFS) is a method of traversing or searching a tree structure (e.g., a binary tree, heap) to reach all nodes in the tree. Consider a tree shown in FIG. 1. The DFS algorithm visits children nodes first before visiting sibling nodes by moving down the tree constantly until it is impossible to do so. Traversing by the DFS usually starts at a root node and explores as far as possible along each branch before backtracking (i.e., retracing one step back to come back to a parent node and exploring the other available paths). By performing DFS traversal, all nodes in a tree can be searched. For example, the DFS algorithm traverses nodes in FIG. 1 in following order (e.g., by starting from a node A):

Current node: A
Get children of this node: B and C
Move down to first child: B
Get children of this node: D and E
Move down to first child: D
Get children of this node: none
Move back up to parent: B
Move down to next child: E
etc.

A second way is walking (i.e., searching) a heap (i.e., a traditional main memory is divided to two sections: stack—storing code currently executing (small area); heap—storing all other code of a program and storing all saved data (large area)) to ascertain which objects are referencing which other objects, and hence how much memory the objects are referencing. The second way is performed by means of a depth first search (DFS). There are a number of tools that utilize the second way: HeapRoots (http://www.alphaworks.ibm.com/tech/heaproots), HeapAnalyzer (http://www.alphaworks.ibm.com/tech/heapanalyzer), and FindRoots (http://www-1.ibm.com/support/docview.wss?rs=3182&context=SSSTCZ&dc=D400&uid=swg24009436&loc=en_US&cs=UTF-8&lang=en). The second way (i.e., a method utilizing the DFS) has an advantage that it provides more useful information than the first way. Besides, the second way (i.e., a method utilizing the DFS) provides a chain of objects that are related to a memory leak and an amount of memory referenced. This information is not provided by the first way. However, the second way has a disadvantage that, because the second way involves maintaining state information of each object (e.g., an amount of memory referenced by each object) while making a traversal of the heap, the second way uses very large amounts of memory. Therefore, the second way can only be used outside a runtime environment (e.g., an executing a virtual machine state which provides software services for processes or programs while a computer is running), acting on a dump of a heap.

Thus, it is highly desirable to provide a memory leak analysis that uses a small amount of memory space, provides useful information (e.g., a chain of objects, an amount of memory referenced), and is executable at a runtime environment.

SUMMARY OF THE INVENTION

It is therefore an object of the present invention to provide a method, system, computer program product, and computer program storage device for performing a memory leak analysis inside a virtual machine.

Most runtime memory leaks are caused by a program storing objects in a collection class and then not removing the objects, leading to an ever growing collection class. Thus, after reachabilities (i.e., a reachability of an object means sum of sizes of all child objects plus a size of the object itself) of objects in a heap have been calculated, a specific pattern (i.e., a single object which references to a number of other objects, such that the reachability of the single object is large) is checked per each object in the heap.

Rather than calculating the reachabilities of all objects on the heap and then applying this pattern (i.e., finding a single object which references to a number of other objects, such that the reachability of the single object is large), the pattern can be applied to a current object (i.e., an object that is currently visited when performing DFS algorithm) as traversing the heap. This technique (i.e., applying the pattern as traversing the heap) has an advantage that this technique radically reduces an amount of data that needs to be stored at a certain time. By applying the pattern inside a running virtual machine, additional information (e.g., data in stack) is available. One embodiment of the present invention makes applying the pattern far simpler by throwing away data in the stack when it is determined that there is no memory leak on an object in the heap. One embodiment of the present invention demonstrates a way of applying a depth first search on a memory leak analysis within an executing virtual machine.

It is highly desirable to be able perform memory leak analysis inside a virtual machine, for two reasons:

1. If a machine (e.g., a web server) is running an application with a memory leak, current solutions automates a process of producing a dump file (i.e., creating a file from contents of a heap) and has a tool to execute a depth first search (DFS) on the dump file. However, these current solutions have a drawback. Once the dump file has been produced and the tool starts running, the current solutions will use large amounts of memory due to storing reachability information (i.e., sum of sizes of all child objects plus a size of the object itself) for every single node in a heap. By contrast, because the present invention performs a memory leak analysis (e.g., looking for an object which has a large reachability with many children, each of which has a small reachability) inside the virtual machine, the present invention can access a heap and a stack. Therefore, an overhead of running the analysis is much smaller as there is no need to duplicate all the information contained in the heap.

2. Current solutions create a dump file (i.e., a file created from contents of a heap) when a machine is completely out of memory. However, the present invention can find out a source of a memory leak before running out of a memory by performing a memory leak analysis (e.g., executing DFS algorithm, applying a memory leak pattern (e.g., whether a reachability of an object is larger than a threshold) on each object, and throwing away stored data in a stack when the data is unnecessary) while a virtual machine is running.

In one embodiment, there is provided a method for performing a memory leak analysis inside a virtual machine comprising:

accessing a heap in a main memory, a node in the heap representing an object;

building a list of root objects from thread stacks and class statics, a thread stack locating in a stack in the main memory, a thread having a thread stack, class statics storing static classes that cannot be discarded;

executing a depth first search (DFS) algorithm on the heap from a root object in the list of root objects, a thread stack, or class statics;

initializing a variable reachability and a variable largest child reachability to zero;

calculating a value of the variable reachability of a current object being visited;

determining a value of the variable largest child reachability of the current object being visited;

comparing the value of the variable reachability of the current object being visited to a first threshold;

comparing the value of the variable largest child reachability of the current object being visited to a second threshold; and when the value of the variable reachability of the current object being visited is larger than the first threshold and when the value of the variable largest child reachability of the current object being visited is less than the second threshold, determining the current object being visited as a source of a memory leak.

In one embodiment, there is provided a system for performing a memory leak analysis inside a virtual machine comprising:

means for accessing a heap in a main memory, a node in the heap representing an object;

means for building a list of root objects from thread stacks and class statics, a thread stack locating in a stack in the main memory, a thread having a thread stack, class statics storing static classes that cannot be discarded;

means for executing a depth first search (DFS) on the heap from a root object in the list of root objects, a thread stack, or class statics;

means for initializing a variable reachability and a variable largest child reachability to zero;

means for calculating a value of the variable reachability of a current object being visited;

means for determining a value of the variable largest child reachability of the current object being visited;

means for comparing the value of the variable reachability of the current object being visited to a first threshold;

means for comparing the value of the variable largest child reachability of the current object being visited to a second threshold; and means for determining the current object as a source of a memory leak, when the value of the variable reachability of the current object being visited is larger than the first threshold and when the value of the variable largest child reachability of the current object being visited is less than the second threshold.

In another embodiment, upon determining an object as a source of memory leak, a reference to the object, a reachability of the object, and largest child reachability of the object (i.e., largest reachability among children of the object) in stack are provided to a user for debugging.

In another embodiment, upon determining that an object is not a source of memory leak, a reference to the object, a reachability of the object, and largest child reachability of the object in stack are removed.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Hereinafter, embodiments of the present invention will be described in detail with reference to the accompanying drawings.

A main memory is divided into two sections:

stack: storing code currently running (small area)

heap: storing all other code of a program and all saved data (large area); in one embodiment, a node in the heap represents an object.

In order to perform a memory analysis, one embodiment of the present invention traverses the heap using a depth first search algorithm (DFS) to find out a reachability of each object (i.e., a reachability of an object means sum of sizes of all child objects plus a size of the object itself).

Figure 2:
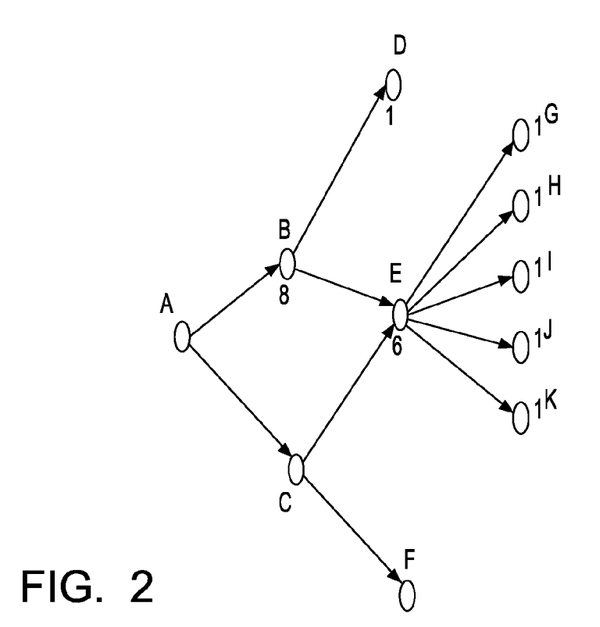
FIG. 2 illustrates a memory leak occurrence in an exemplary heap.

To facilitate a memory leak analysis, one embodiment of the present invention defines several variables as the following:

- a variable "count": total sizes or number of all objects that are fully visited (e.g., when an object and its all children are processed by the DFS algorithm, the object becomes "fully visited") before by the DFS algorithm; this is a global variable that is shared with objects. After an object is fully processed, fully discovered, or fully visited, the variable "count" is increased by the size of the object that just fully processed. In other words, when executing a DFS algorithm, the variable "count" is not changed while going down the heap. However, the variable "count" is increased whenever revisiting a parent node.
- a variable "count on entry": When an object in the heap is visited first by the DFS algorithm, the current value of the variable "count" is stored as "count on entry" of the object. An object being processed has a variable "count on entry" in the stack. When an object is determined not as a source of a memory leak, the variable "count on entry" of the object is discarded from the stack.
- a variable "reachability": total sizes/number of all the objects referenced by an object; sum of sizes of all objects recursively referenced by an object; sum of sizes of all child objects plus a size of the object itself; For example, in FIG. 1, a reachability of an object (e.g., an object A) can be calculated by adding sizes of all the objects (e.g., objects B and C) referenced by the object (e.g., an object A) directly, then adding sizes of all the objects (e.g., objects D, E, and F) reference by them (e.g., objects B and C), and then adding sizes of all the objects (e.g., objects G, H, I, J, and K) referenced by them (e.g., object E). If we assume each object in FIG. 1 has a unit size 1, a reachability of each leaf node (e.g., node G, node H, node I, node J, and node K) is 1. The reachability of the node F is 6. The reachability of the node D is 1. The reachability of the node B is 8. The reachability of the node F is 1. The reachability of the node C is 2. The reachability of the node A is 11. FIG. 2 illustrates a value of a reachability of a node E and a value of a reachability of each leaf node, when each object in FIG. 2 has a unit size 1. In one embodiment, an object being processed has a variable "reachability" in the stack. In another embodiment, as soon as a reachability of an object is calculated, a memory leak analysis (e.g., whether a reachability of the object is larger than a threshold) is applied. If a memory leak is not found upon performing the memory leak analysis, the value of the reachability of the object is discarded. If a memory leak is found upon performing the memory leak analysis, the value of reachability of the object is reported to a user via an output device (e.g., a display device, a printing device). Therefore, a value of a reachability of an object is reported or discarded without being stored in the stack as soon as a memory leak analysis is finished. In one embodiment, a reachability of an object is calculated by subtracting the value of the variable "count on entry" of the object from a current value of a variable "count" (i.e., a reachability=current count−count on entry).
- a variable "largest child reachability": an object being processed has a variable "largest child reachability" in the stack. The variable "largest child reachability" of an object stores a largest reachability value among children of the object. In FIG. 2, a largest child reachability of a node B is 6, which is a reachability value of a node E. In one embodiment, when an object is fully processed (e.g., all children are discovered by a DFS algorithm), a reachability of the object is compared to a current largest child reachability of the object's parent. If the reachability of the object is larger than the current largest child reachability of the object's parent, the current largest child reachability of the object's parent is set to the reachability of the object. In another embodiment, a reachability of an object is compared to reachabilities of the object's siblings. When the reachability of the object is largest among reachabilites of the object's siblings, the reachability of the object is stored in the stack as a value of the largest child reachability of the object's parent. When an object is determined not as a source of a memory leak, the variable "largest child reachability" of the object is discarded from the stack.

In one embodiment, the stack also stores a reference (i.e., a relation between objects in which one object designates, or acts as a means by which to connect to or link to, another object) to an object that is currently processed by a DFS algorithm. For example, in FIG. 1, before a node E is first visited, the stack has a reference to a node A, a reference to a node B, and a reference to a node D. When an object is determined not as a source of a memory leak, the reference to the object is discarded from the stack. In one embodiment, arrows in FIG. 1 indicate references between objects (e.g., a node A reference a node B; a node G is referenced by node E).

A memory leak pattern is usually a collection class with a large number of objects, each of which has a small reachability compared to the collection class as a whole. Each of these objects is a child of the collection class. Since a memory leak is usually caused by a programming mistake that does not remove objects from a collection class when the objects are no longer necessary, the collection class usually results in a very large collection. Therefore, by calculating a largest child reachability of an object and comparing the largest child reachability of the object to a reachability of the object, it can be determined whether the object is a source of a memory leak or not. For example, if a largest child reachability of an object is 60% of a reachability of the object, the object is unlikely to be a source of a memory leak. However, if a largest child reachability of an object less than 50% of a reachability of the object, the object is likely to be a source of a memory leak.

In one exemplary embodiment, in FIG. 1, by walking the heap and storing a "count on entry" and a "reachability" at each node, Table 1 can be composed.
(Assume that each object has a unit size 1. A variable "count", a variable "count on entry" of each object, a variable "reachability" of each object, a variable "largest child reachability" of each object are initialized to zero

TABLE 1

| Node | Count on entry | Reachability |
|------|----------------|--------------|
| D    | 0              | 1            |
| G    | 1              | 1            |
| H    | 2              | 1            |
| I    | 3              | 1            |
| J    | 4              | 1            |
| K    | 5              | 1            |
| E    | 1              | 6            |
| B    | 0              | 8            |
| F    | 8              | 1            |
| C    | 8              | 2            |
| A    | 0              | 11           |

When a node E is fully processed (e.g., all children of the node E is discovered), a reachability of the node E is calculated as 6. The largest child reachability of the node E has been calculated as 1. Thus, by applying a memory leak analysis pattern (i.e., looking for a collection class with a large reachability with many children, each of which has a small reachability), the node E can be determined as a source of a memory leak due to a large "reachability" and a small "largest child reachability". Though this walking the heap (e.g., FIG. 1) and storing two pieces information (e.g., "count one entry" and "reachability") every node is straightforward, it requires lots of memory space due to storing two piece information every node.

Storing the two piece information for every single node can be avoided by throwing away the information of an object after the object is determined not as a source of a memory leak by applying a memory leak analysis pattern as walking the heap. There is a memory leak if there is one node that has a large reachability that is composed of many children, each of which has noticeably smaller reachability. For example, if a largest child reachability of an object is less than 50% of a reachability of the object, the object can be a source of a memory leak. Therefore, if a reachability of a current object (i.e., an object that is currently processed or visited by a DFS algorithm) and reachabilities of children of the current object are known at a given time, a memory leak analysis can be applied. If a memory leak is not found at an object, information (e.g., reachability) of the children of the object can be thrown away. Then, by moving to a parent node of the object, a reachability of the parent node is compared to reachabilities of children of the parent node.

In one embodiment, the reachability of each object can be stored in a stack that represents a path to a currently processing node. Since a reachability of an object is compared to a largest child reachability of the object, the largest child reachability can be stored as an additional information in the stack. In another embodiment, without storing the largest child reachability as additional information, a reachability of an object is compared to all children's reachabilities to find out if the object is a source of a memory leak or not.

In one exemplary embodiment, if a DFS algorithm is executed up to an object D (i.e., the object D is fully processed), the stack has information as like Table 2.

TABLE 2

| Node | Count on entry | Reachability | Largest child reachability |
|---|---|---|---|
| A | 0 | 0 | 0 |
| B | 0 | 0 | 0 |
| D | 0 | 1 | 0 |

By applying a memory leak analysis (e.g., determining whether an object has a large reachability with many children, each of which has a small reachability), the object D is determined not as a source of a memory leak. Then, the information of the object D is discarded in the stack. Table 3 shows information in stack after information of the object D is discarded.

TABLE 3

| Node | Count on entry | Reachability | Largest child reachability |
|---|---|---|---|
| A | 0 | 0 | 0 |
| B | 0 | 1 | 1 |

After the DFS algorithm processes objects E, G, H, I, J, and K, the stack has following information as like Table 4 (information of the objects G, H, I, J, and K has been discarded after being determined not as a source of a memory leak).

TABLE 4

| Node | Count on entry | Reachability | Largest child reachability |
|---|---|---|---|
| A | 0 | 0 | 0 |
| B | 0 | 1 | 1 |
| E | 1 | 6 | 1 |

When the object E is fully processed (e.g., right after all children of the node E is discovered), a memory leak analysis is applied for the object E and then the object E is determined that the object E can be a source of a memory leak (i.e., a reachability of the object E is large (6); a largest child reachability of the object E is less than 50% of the reachability of the object E; So, it is determined that the object E can be a source of a memory leak).

By throwing away information of an object when the object is determined not as a source of a memory leak, an amount of information that needs to be stored in the stack has been reduced from two piece information per every single node to two or three piece information per objects that are currently processed.

However, an amount of a required memory space can be further reduced by not saving a reachability of an object in the stack. In one embodiment of the present invention, the stack stores "count on entry" and "largest child reachability" of currently being processed objects. In another embodiment, the stack stores "reference to the object", "Count on entry", and "Largest child reachability". To achieve this (i.e., not saving reachability), a memory leak analysis is applied as soon as a reachability of an object is calculated (e.g., by being fully processed). If an object is found as a source of a memory leak, a reachability value of the object is provided to a user (e.g., a programmer) along with reference(s) to the object and a largest child reachability of the object. If an object is found not as a source of a memory leak, a reachability value of the object discarded along with a reference to the object and a largest child reachability of the object. In one embodiment, every time a reachability of an object is calculated or updated, a reachability of an object is compared to a current largest child reachability of a parent of the object. If the reachability of the object is larger than the current largest child reachability of the parent of the object, the reachability of the object is set to the largest child reachability of the parent of the object.

In one exemplary embodiment, when starting to execute a DFS algorithm on FIG. 1, a variable "count" is set to 0. A first root object (e.g., a node A) is placed on stack along with its "count on entry". A largest child reachability of an object is always initialized to zero. Table 5 shows the initial condition of stack when starting to execute a DFS algorithm on FIG. 1.

TABLE 5

| (Variable "Count" = 0) | | |
|---|---|---|
| Reference to the object | Count on entry | Largest child reachability |
| A | 0 | 0 |

While performing the DFS algorithm, children are discovered and "count on entry" is entered for each child in the stack. Table 6 shows a stack condition just before D is fully processed.

TABLE 6

(Variable "Count" = 0 because the object D is not fully processed yet)

| Reference to the object | Count on entry | Largest child reachability |
|---|---|---|
| A | 0 | 0 |
| B | 0 | 0 |
| D | 0 | 0 |

When an object with no more unprocessed children (e.g., a node D) is reached, the variable "Count" is increased by a size of the object. In FIG. 1, each object has a unit size 1. Therefore, the variable "Count" becomes 1. Then, a reachability of the object is calculated by subtracting "count on entry" value from a current "Count" value (i.e., reachability=count on entry−count). After the reachability of the object is calculated, a memory leak analysis is performed by checking:

1. Is the reachability of the object is larger than a first threshold (e.g., a specified size)?
2. Is the largest child reachability of the object is less than a second threshold (e.g., a specified percentage of an reachability of the object)?

If the object does not show a memory leak, a reference to the object is removed from the stack and related data (e.g., "count on entry" of the object and/or "largest child reachability" of the object) are removed from the stack. Table 7 shows a stack condition after the object D and its related data are removed in the stack.

TABLE 7

(Variable "Count" = 1 because an object D is fully processed)

| Reference to the object | Count on entry | Largest child reachability |
|---|---|---|
| A | 0 | 0 |
| B | 0 | 1 |

This exemplary embodiment reduces a memory space required to perform a memory leak analysis by throwing away data of an object after the object is determined that the object is not a source of a memory leak. At any time, the stack stores three piece information (e.g., "reference to the object", "count on entry", "largest child reachability") for each object in a chain of objects that is currently processing.

After moving to an object E, a reachability of each child of the object E is calculated. After calculating a reachability of a last child (e.g., an object K) of the object E, the stack has following information like Table 8.

TABLE 8

(Variable "Count" = 6 because objects D and G-K are fully processed)

| Reference to the object | Count on entry | Largest child reachability |
|---|---|---|
| A | 0 | 0 |
| B | 0 | 1 |
| E | 1 | 1 |

After the object E is fully processed (i.e., right after all children of the object E are fully processed), the variable "Count" is incremented by a size of the object E (e.g., Variable "Count" becomes 7). Then, a memory leak analysis applied on the object E. Because the object E has a large reachability and a largest child reachability is small (e.g., a reachability of the object E: 6, a largest child reachability: 1), the object E is determined as a potential source of a memory leak. Then, a current stack information (e.g., Table 8 including references to the object (e.g., a node A, a node B, and a node E)) and a reachability of the object E are provided to a programmer to find a bug causing the memory leak.

In one embodiment, an object is considered a potential memory leak if following two conditions are true:
1. A reachability of the object is larger than a specified size (e.g., 100 Megabytes).
2. A largest child reachability of the object is less than a specified percentage of a reachability of the object (e.g., 50%).

In one embodiment, a memory leak analysis (i.e., looking for an object with a large reachability with many children, each of which has a small reachability) is applied outside a virtual machine. If a memory leak analysis is applied outside a virtual machine (i.e., a software implementation used to run programs that are written by a non-operating system specific intermediate code (e.g., Java or .NET); Once the programs are interpreted by an interpreter, the programs can run on any operating system with a virtual machine), a DFS algorithm may start at any section of a heap. To execute a memory leak analysis outside a virtual machine, whenever a node is visited, the node is marked as visited and a reachability of the node is recorded in the node. Then, another node that has not been marked is processed. This embodiment requires an entire structure of the heap because a reachability has to be stored at every single node. This embodiment requires a lot of memory space to store a reachability at every single node in the heap.

When a memory leak analysis is performed outside a virtual machine, if a reachability is not stored at each node in the heap, a memory leak may not be discovered. For example, while starting to execute a DFS algorithm on FIG. 1, if a first node discovered is a node G, a reachability of the node G is calculated and then determined there is no possible memory leak form the node G. Then, the object G is marked as complete and related data (e.g., count on entry, reachability) of the node G are discarded. After the node G is fully processed, nodes H-K are processed. Each reachabilities of the nodes H-K is calculated and then determined nodes H-K are not a source of a memory leak. Then, nodes H-K are marked complete and related data of the nodes G-K are discarded. After the nodes G-K are fully processed, a node E is discovered. Because all children of the node haven been fully processed before the node E is visited, "count on entry" of the node E becomes 5. The variable "Count" value becomes 6 after E is processed. Then, the reachability of the node E becomes 1 (i.e., a reachability=current "Count" value−"Count on entry" value). Because the reachability of the node E is small, it is unlikely that the node E is determined as a source of a memory leak. However, if each child (e.g., nodes G-K) has saved a reachability in the heap, the reachability of the node E can be determined as 6 by summing a reachability of each child and a size of the node E (e.g., a reachability of the node E=a reachability of a node G+a reachability of a node H+a reachability of a node I+a reachability of a node J+a reachability of a node K+a size of the node E). Then, a memory leak from the node E can be found by applying a memory leak analysis pattern (i.e., looking for an object that has a large reachability with many children, each of which has small reachability).

Figure 3:
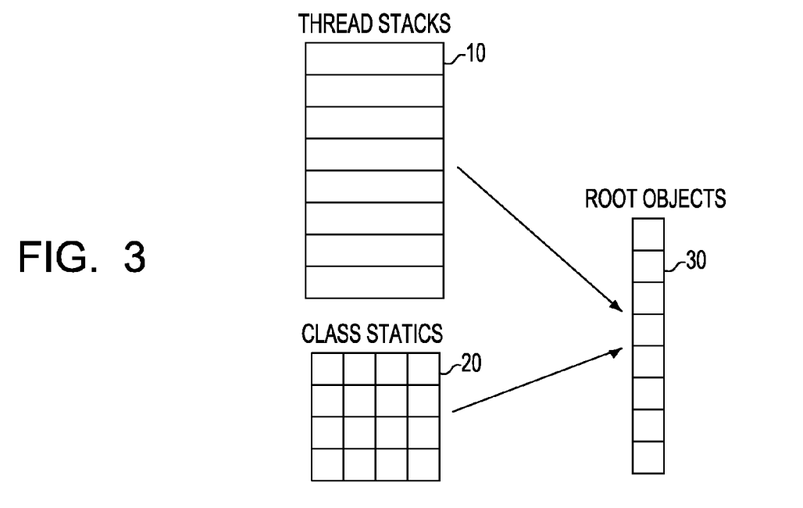
FIG. 3 illustrates building a list of root objects from thread stacks and class statics.

In one embodiment, a memory leak analysis is performed inside a virtual machine. Working inside a virtual machine enables to access additional information such as thread stacks (i.e., Most modern programs are composed of multiple threads of execution; Stack is actually composed of multiple section; As one section in the stack is used by one thread, each section is called a thread stack) and class statics (i.e., Class statics are a way for a programmer to define information that must be retained at all times; Class statics stores static classes that cannot be disposed by a garbage collector). FIG. 3 depicts creating a list of root objects. By scanning the thread stacks 10 and class statics 20, a list of root objects 30 are created. A root object is an object that is currently being used by a program or cannot be disposed by a garbage collector (i.e., an automatic memory management unit for disposing objects that are not referenced by an object).

Figure 4:
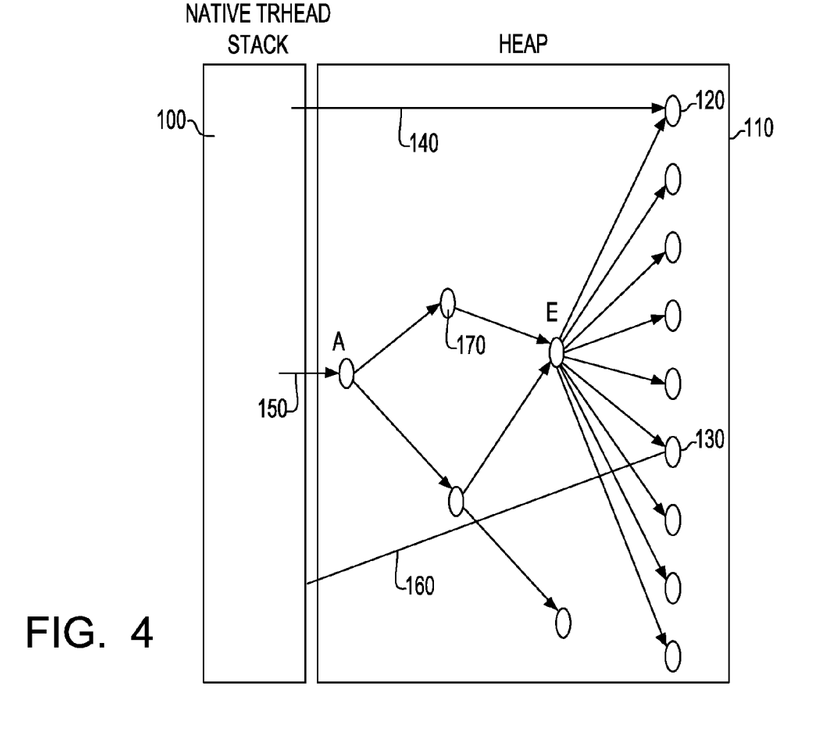
FIG. 4 illustrates detecting a source of a memory leak by utilizing a thread stack and a depth first search (DFS).

FIG. 4 depicts a thread stack (100), which is accessible inside a virtual machine, is utilized a memory leak analysis. Objects in the thread stacks are objects that are used by a program. Therefore, if an object in a heap 110 is used by a program, the object is referenced from a thread stack 100 and another object (e.g., a collection class) in the heap 110. If an object is no longer used by a program, there is no reference from the thread stack 100 to the object and there is only a reference from another object in the heap 110. Arrows 140, 150, and 160 indicates references from the thread stack 100 to objects 120, 150, and 160. Running a memory leak analysis in a virtual machine enables access to a list of root objects, a thread stack and/or class statics. By starting a DFS algorithm from a root object in the list of root objects, thread stack and/or class statics, a small number of children of an object may be discovered first before the object is visited. However, this early discovery of a small number of children does not affect finding a source of a memory leak, because a memory leak occurs when an object (e.g., a collection class) references to many objects that are not reference by any other object or any program. Since the number of children that are discovered first by being referenced by other objects or a program are small, the small number of objects does not affect when calculating a reachability of an object that is a source of memory leak and that holds on many objects as children. For example, a collection class is a source of a memory leak, because the collection class, which is supposed to reference 15 megabytes of a memory, has grown to reference to one hundred megabytes of the memory. If thirty megabytes of the memory referenced by the collection class are used by a program and other seventy megabytes of the memory are not used anywhere, all the thirty megabytes of the memory can be discovered first by being referenced from a native thread stack 10 or class statics 20. However, when a DFS started at a root object in the thread stack 10 or class statics 20 visits the collection class, which is a source of a memory leak, it can be determined that the collection class is a source of a memory leak by calculating a reachability of the collection class (e.g., the reachability of the collection class may be around 70 megabytes). Because the collection class has a large reachability (e.g., 70 megabytes), by performing a memory leak analysis (e.g., looking for an object that has a large reachability with many children, each of which has a small reachability), it can be determined a potential source of a memory leak.

In one exemplary embodiment, FIG. 4 depicts performing a source of a memory leak in a virtual machine. A thread stack 100 including root objects has three references to a heap 110. If a DFS algorithm started from a root object having a reference 140, an object 120 in the heap 110 is visited first. A value of a variable "Count on entry" of the object 120 is recorded as 0 in a stack. Because the object 120 does not have any child, a value of a variable "largest child reachability" of the object 120 is recorded as 0 in a stack. After the object 120 is fully processed (i.e., right after being determined that there is no child in the object 120), a variable "Count" is incremented by a size of the object 120. If it is assumed that each object in the heap 110 has a unit size 1, the variable "Count" becomes 1. Then, a reachability of the object 120 is determined as 1 by subtracting a "Count on entry" value from a current "Count" value. Because the reachability of the object 120 is small and the largest child reachability of the object 120 is 0, it is determined that the object 120 is not a source a memory leak. The object 120 is marked as completed on the heap 110. The object 120 and related data (e.g., "Count on entry" and/or "Largest child reachability") are removed from the stack. After the object 120 is fully processed, the DFS algorithm starts at another root object that has a reference 160 to the heap 110. Then, an object 130 is visited. As like processing the object 120, a reachability of the object 130 is calculated and determined that it is not a source of a memory leak. The object 130 is marked as completed. The object 130 and related data are removed from the stack. The variable "Count" is incremented by a size of the object 130, after the object 130 is fully processed (e.g., the variable "Count" becomes 2). Finally, the DFS algorithm is started at a root object that has a reference 150 to the heap 110. Then, an object A is visited. A value of a variable "Count on entry" of the object A is recorded as 2 in the stack. Upon finding that there are children of the object A, a child (e.g., an object 170) of the object A is visited. A value of a variable "Count on entry" of the object 170 is recorded as 2 in the stack. Upon finding that there are children of the object 170, a child (e.g., an object E) of the object 170 is visited. A value of a variable "Count on entry" of the object E is recorded as 2 in the stack. Upon finding that there are children of the object E, unprocessed children (i.e., children that are not visited or discovered yet by a DFS algorithm) of the object E are visited. Because unprocessed children of the object E do not have any children, a reachability of each unprocessed children is calculated. Upon fully processing all the unprocessed children, a value of a variable "largest child reachability" of the object E is recorded as 1 in the stack (i.e., reachabilities of all unprocessed children of the object E are 1, because the unprocessed children do not have any descendants). After the object E itself is fully processed, a reachability of the object E is calculated as 8 (i.e., a current "Count" value (10)–"Count on entry" value (2)). Then, by applying a memory leak analysis (e.g., looking for an object that has a large reachability with many children, each of which has a small reachability), the object E is determined as a source of memory leak (e.g., because the reachability of the object E is large (8) and a largest child reachability of the object E is small (1)), though two children (e.g., the object 120 and the object 130) are visited first before the object E is visited.

Therefore, performing a memory leak analysis in a virtual machine enables to access thread stack(s), class static(s), and/or a list of root objects. By utilizing the thread stack(s)), class static(s), and/or a list of root objects, a DFS algorithm can be started at root objects that are currently processed by a program. Though performing a DFS algorithm at root objects can make a few children of an object be visited first before the object is visited, upon reaching the object, the object can be properly determined as a source of memory leak. Because the number of the children visited or processed first does not affect calculating a reachability of an object that has a lot of children, most of which are referenced by only the object. Therefore, upon calculating a reachability of the object, it can be properly determined whether the object is a source of a memory leak or not. Furthermore, performing a memory leak analysis in a virtual machine enables to remove an object and its related data from a stack, when the object is determined not as a source of a memory leak. Therefore, performing a memory leak analysis in a virtual machine reduces a required memory space. In addition, while performing a DFS algorithm and a memory leak analysis, no change is made to a structure of the heap 110.

Figure 5:
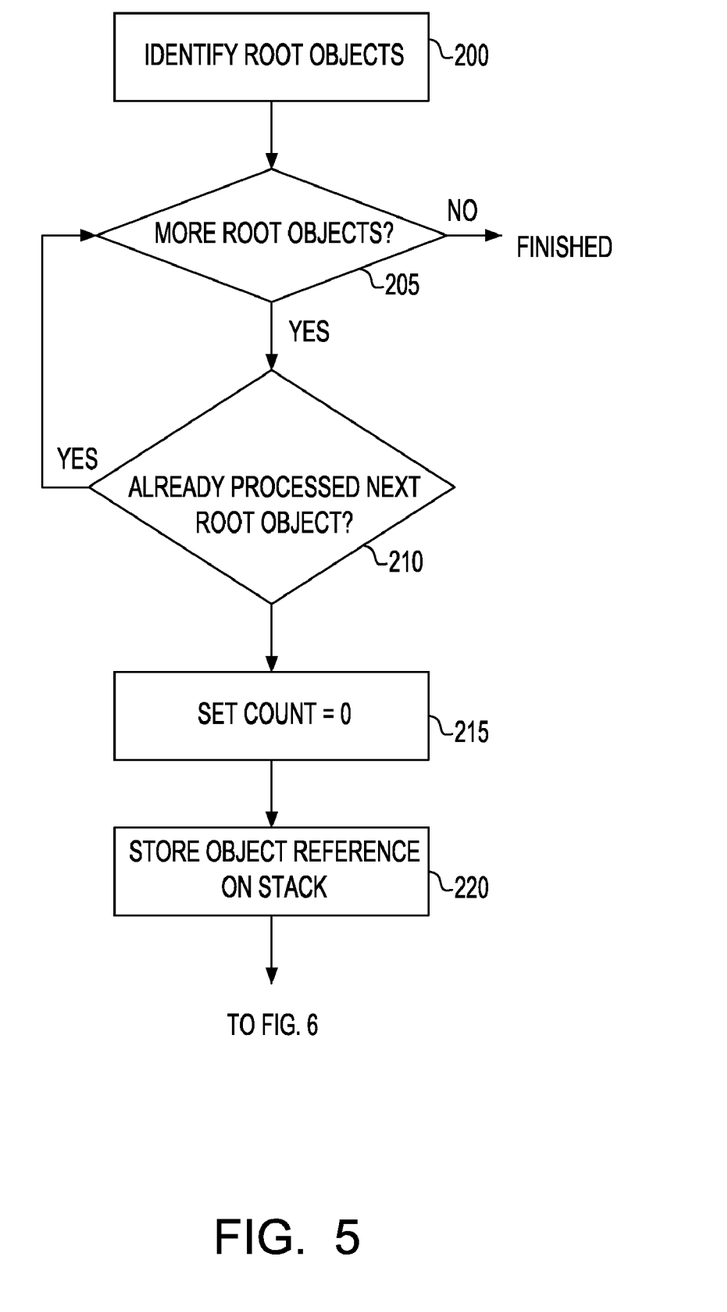
FIGS. 5-6 illustrates a flow chart that the present invention employs.
Figure 6:
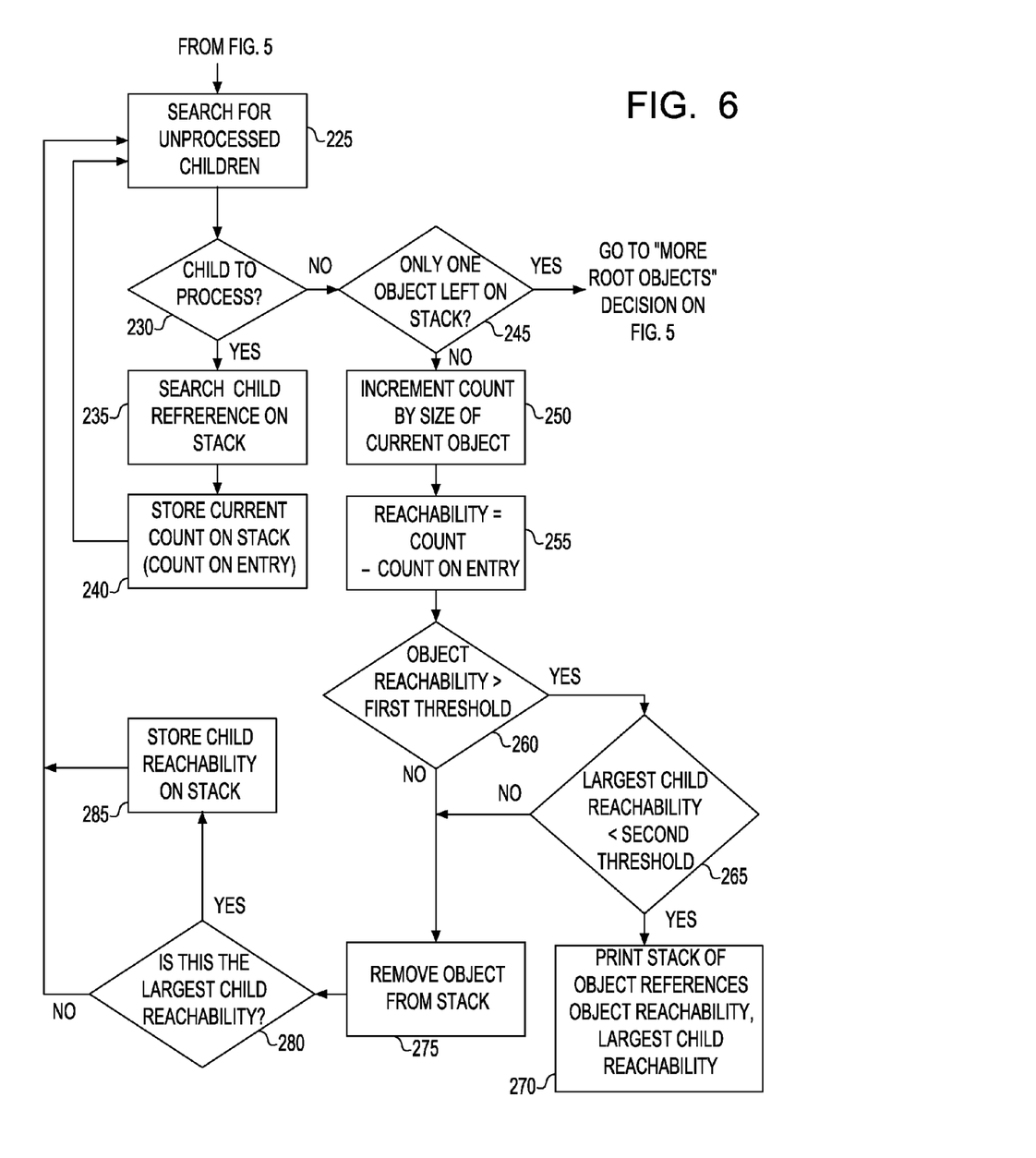

FIGS. 5-6 depicts a flow chart that one embodiment of the present invention employs. At step 200, stacks 10, class statics 20, or a list of root objects 30 are accessed inside a virtual machine to identify root objects. At step 205, it is checked whether there are root objects in the thread stacks 10, class statics 20, or a list of root objects 30. If there is no root object or if all root objects are already processed, looking for a source of a memory leak is finished. If there is a root object in the thread stacks 10, class statics 20, or a list of root objects 30, at step 210, it is checked whether the root object is already processed or not. In one embodiment, when the root object is already processed, at step 210, it is further checked whether there is a next available (e.g., unprocessed) root object in the thread stacks 10, class statics 20, or a list of root objects 30. If the root object is already processed, it is checked whether there are other root objects at step 205.

If the root object is not processed, at step 215, a variable "Count" is initialized to 0. At step 220, a reference to the root object is stored in a stack. The root object is set to a current object (i.e., an object that is currently visited or processed by a DFS algorithm). At step 225, it is checked whether there are unprocessed children (e.g., not visited children) of the current object (e.g., the root object). At step 230, if there is an unprocessed child, the unprocessed child is set to the current object. At step 235, a reference to the unprocessed child is stored in the stack. A current value of the variable "Count" is stored in the stack as a value of the variable "Count on entry" of the unprocessed child. Then, by going back to step 225, it is checked whether there are unprocessed children of the current object (e.g., the unprocessed child). If it is determined that there is no unprocessed child, at step 245, it is checked whether only one reference (e.g., a reference to an object) is left in the stack. If there is only one reference in the stack, it is checked whether there are more root objects in the thread stacks 10, class statics 20, or a list of root objects 30 by going back to step 205.

If more than one reference are left in the stack, at step 250, the variable "Count" is incremented by a size of the current object. At 255, a reachability of the current object is calculated by subtracting a value of a variable "Count on entry" of the current object from a current value of a variable "Count". At step 260, the reachability of the current object is compared to a first threshold (e.g., 100 megabytes). At step 265, the largest child reachability of the current object is compared to a second threshold (e.g., half of the reachability of the current object). When the reachability of the current object is larger than the first threshold and the largest child reachability of the current object is less than a second threshold, it is determined that the current object is a potential source of a memory leak. At step 270, when an object is determined as a potential source of a memory leak, references to the object (e.g., a chain of objects before reaching the object), the reachability of the object, and the largest child reachability of the current object are provided to a user via an output device (e.g., a display device or a printing device). At step 260, if the reachability of the current object is less than or equal to the first threshold, it is determined that the current object is not a source of a memory leak. At step 265, if the largest child reachability of the current object is larger than or equal to a second threshold, it is determined that the current object is not a source of a memory leak.

At step 275, the current object's data (e.g., a reference to the current object, a variable "Count on entry" of the current object, a variable "largest child reachability" of the current object) are removed from the stack. At step 280, the reachability of the current object is compared to a current value of a variable "largest child reachability" of a parent of the current object. At step 285, if the reachability of the current object is larger than a current value of a variable "largest child reachability" of a parent of the current object or if the reachability of the current object is largest among reachabilities of siblings of the current object, a value of a variable "reachability" of the current object is stored in the stack as a value of a variable "largest child reachability" of the parent of the current object. At step 280, if the reachability of the current object is not larger than a current value of a variable "largest child reachability" of a parent of the current object, the reachability of the current object is discarded. Then, a parent of current object is set to a current object and then it is checked whether there is an unprocessed child of the current object by going back to step 225. At step 285, after storing a value of a variable "reachability" of the current object as a value of a variable "largest child reachability" of the parent of the current object, the reachability of the current object is discarded. Then, a parent of current object is set to a current object and then it is checked whether there is an unprocessed child of the current object by going back to step 225.

Although the preferred embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention.

What is claimed is:

1. An automated method for performing a memory leak analysis inside a virtual machine comprising:
   accessing a heap in a main memory, a node in the heap representing an object;
   building a list of root objects from thread stacks and class statics, a thread stack locating in a stack in the main memory, a thread having a thread stack, class statics storing static classes that cannot be discarded;
   executing a depth first search (DFS) algorithm on the heap from a root object in the list of root objects, a thread stack, or class statics;
   initializing a variable reachability and a variable largest child reachability to zero and calculating a value of the variable reachability of a current object being visited by subtracting a value of a variable count on entry from a value of a current variable count, the current value of the variable count being determined by a size of all objects fully visited before, the value of the variable count on entry being determined by a current value in the variable count upon visiting the current object;
   determining a value of the variable largest child reachability of the current object being visited, the value of the variable largest child reachability of the current object being visited being determined by a largest reachability value among children of the current object being visited;
   comparing the value of the variable reachability of the current object being visited to a first threshold;
   comparing the value of the variable largest child reachability of the current object being visited to a second threshold; and
   when the value of the variable reachability of the current object being visited is larger than the first threshold and when the value of the variable largest child reachability of the current object being visited is less than the second threshold, determining the current object being visited as a source of a memory leak,
   wherein the accessing step, the building step, the executing step, the initializing step, the calculating step, the comparing steps and the determining step are performed inside the virtual machine.

2. The method according to claim 1, further comprising:
   initializing the variable count and the variable count on entry to zero;
   upon visiting an object in the heap, for an object, storing the variable count on entry, the variable largest child reachability, and a reference to the object in the stack, each object having a variable count on entry, a variable largest child reachability, and a reference to the object in the stack; and
   if the current object being visited has no child or has all fully processed children in the heap, increasing a current value of the variable count by size of the current object being visited.

3. The method according to claim 2, further comprising:
   for each object, storing the variable reachability in the stack.

4. The method according to claim 1, wherein
   upon determining that the current object being visited is the source of a memory leak, the variable count on entry of the current object being visited, the variable largest child reachability of the current object being visited, and a reference to the current object being visited in the stack are provided to a user.

5. The method according to claim 1, further comprising:
   for the current object being visited, removing the variable count on entry of the current object being visited, the variable largest child reachability of the current object being visited, and a reference to the current object being visited in the stack.

6. The method according to claim 1, wherein
   when the value of the variable reachability of the current object being visited is less than or equal to the first threshold, the current object being visited is not determined as a source of a memory leak.

7. The method according to claim 1, wherein
   when the value of the variable largest child reachability of the current object being visited is larger than or equal to the second threshold, the current object being visited is not determined as a source of a memory leak.

8. The method according to claim 1, wherein
   if the value of the variable reachability of the current object being visited is a largest value among siblings of the current object being visited, the value of the variable reachability of the current object being visited is stored in the stack as a value of a variable largest child reachability of a parent of the current object being visited.

9. The method according to claim 1, further comprising:
   searching for unprocessed children of the current object being visited.

10. A computer program product comprising computer usable medium having computer readable program code means embodied therein for performing a memory leak analysis inside a virtual machine the computer program code means in said computer program product comprising computer readable program code means for causing the computer to effect the functions of claim 1.

11. A computer program storage device, readably by machine, tangibly embodying a program of instructions executable by a machine to perform method steps for performing a memory leak analysis inside a virtual machine, said method steps comprising the steps of claim 1.

12. A system for performing a memory leak analysis inside a virtual machine comprising:
   a computing system,
   wherein the computing system is configured to:
   access a heap in a main memory, a node in the heap representing an object;
   build a list of root objects from thread stacks and class statics, a thread stack locating in a stack in the main memory, a thread having a thread stack, class statics storing static classes that cannot be discarded;
   execute a depth first search (DFS) on the heap from a root object in the list of root objects, a thread stack, or class statics;
   initialize a variable reachability and a variable largest child reachability to zero and calculate a value of the variable reachability of a current object being visited by subtracting a value of a variable count on entry from a value of a variable count, the value of the variable count being determined by a size of all objects fully visited before, the value of the variable count on entry being determined by a current value in the variable count upon visiting the current object;

determine a value of the variable largest child reachability of the current object being visited, the value of the variable largest child reachability of the current object being visited being determined by a largest reachability value among children of the current object being visited;

compare the value of the variable reachability of the current object being visited to a first threshold;

compare the value of the variable largest child reachability of the current object being visited to a second threshold; and determine the current object as a source of a memory leak, when the value of the variable reachability of the current object being visited is larger than the first threshold and when the value of the variable largest child reachability of the current object being visited is less than the second threshold.

13. The system according to claim 12, wherein the computing system is further configured to:

initialize the variable count and the variable count on entry to zero;

store the variable count on entry, the variable largest child reachability, and a reference to an object in the stack, each object having a variable count on entry, a variable largest child reachability, and a reference to the object in the stack; and increase a current value of the variable count by size of a current object being visited.

14. The system according to claim 13, wherein the computing system is further configured to:

store the variable reachability of each object in the stack.

15. The system according to claim 12, further comprising:

provide the variable count on entry of the current object being visited, the variable largest child reachability of the current object being visited, and a reference to the current object being visited in the stack to a user when the current object is determined as the source of a memory leak.

16. The system according to claim 12, wherein the computing system is further configured to:

remove the variable count on entry of the current object being visited, the variable largest child reachability of the current object being visited, and a reference to the current object being visited in the stack.

17. The system according to claim 12, wherein the computing system is further configured to:

determine the current object being visited not as a source of a memory leak when the value of the variable reachability of the current object being visited is less than or equal to the first threshold.

18. The system according to claim 12, wherein the computing system is further configured to:

determine the current object being visited not as a source of a memory leak when the value of the variable largest child reachability of the current object being visited is larger than or equal to the second threshold.

19. The system according to claim 12, wherein if the value of the variable reachability of the current object being visited is a largest value among siblings of the current object, the value of the variable reachability of the current object being visited is stored in the stack as a value of a variable largest child reachability of a parent of the current object being visited.

20. The system according to claim 12, wherein the computing system is further configured to:

search for unprocessed children of the current object being visited.

* * * * *